(12) United States Patent
Airaud et al.

(10) Patent No.: US 10,310,735 B2
(45) Date of Patent: Jun. 4, 2019

(54) DATA STORAGE

(71) Applicant: ARM Limited, Cambridge (GB)

(72) Inventors: Cédric Denis Robert Airaud, Paris (FR); Max John Batley, Cambridge (GB); Ian Michael Caulfield, Cambridge (GB); Thomas Edward Roberts, Cambridge (GB)

(73) Assignee: ARM Limited, Cambridge (GB)

( * ) Notice: Subject to any disclaimer, the term of this patent is extended or adjusted under 35 U.S.C. 154(b) by 157 days.

(21) Appl. No.: 15/440,254

(22) Filed: Feb. 23, 2017

(65) Prior Publication Data

US 2017/0249085 A1    Aug. 31, 2017

(30) Foreign Application Priority Data

Feb. 25, 2016    (GB) .................................. 1603295.5

(51) Int. Cl.
*G06F 12/00*    (2006.01)
*G06F 13/00*    (2006.01)
(Continued)

(52) U.S. Cl.
CPC ............ *G06F 3/0604* (2013.01); *G06F 3/061* (2013.01); *G06F 3/0638* (2013.01);
(Continued)

(58) Field of Classification Search
CPC ...... G06F 3/0604; G06F 3/061; G06F 3/0638; G06F 3/0673; G06F 12/0223;
(Continued)

(56) References Cited

U.S. PATENT DOCUMENTS 5,555,395 A *   9/1996   Parks .................. G06F 12/1027
                                                        711/145
5,584,005 A *   12/1996   Miyaoku ............. G06F 12/0292
                                                        711/206

(Continued)

OTHER PUBLICATIONS

Combined Search and Examination Report for GB1603295.5 dated Jul. 29, 2016, 6 pages.

*Primary Examiner* — Sheng Jen Tsai
(74) *Attorney, Agent, or Firm* — Nixon & Vanderhye P.C.

(57) ABSTRACT

Data storage apparatus comprises detection circuitry configured to detect a match between a multi-bit reference memory address and a test address, the test address being a combination of a multi-bit base address and a multi-bit address offset, the detection circuitry comprising: a comparator configured to compare, as a first comparison, a first subset of bits of the reference memory address with a combination of the corresponding first subset of bits of the base address and the corresponding first subset of bits of the address offset; the comparator being configured to compare, as a second comparison, a second, different subset of bits of the reference memory address with the corresponding second subset of bits of the base address; a detector configured to detect the match between the reference memory address and the test address when both of the first comparison and the second comparison detect a respective match; and control circuitry configured to control operation of the data storage apparatus in dependence upon the reference memory address when a match is detected by the detector.

13 Claims, 3 Drawing Sheets

(51) Int. Cl.
  *G06F 3/06* (2006.01)
  *G06F 12/06* (2006.01)
  *G06F 12/02* (2006.01)
  *G06F 12/0893* (2016.01)

(52) U.S. Cl.
  CPC ........ *G06F 3/0673* (2013.01); *G06F 12/0223* (2013.01); *G06F 12/0646* (2013.01); *G06F 12/0893* (2013.01); *G06F 2212/1016* (2013.01); *G06F 2212/1028* (2013.01); *Y02D 10/13* (2018.01)

(58) Field of Classification Search
  CPC ............. G06F 12/0646; G06F 12/0893; G06F 2212/1016; G06F 2212/1028
  USPC ......................................................... 711/154
  See application file for complete search history.

(56) References Cited

U.S. PATENT DOCUMENTS

| | | | | |
|---|---|---|---|---|
| 5,878,245 A * | 3/1999 | Johnson | ............. | G06F 9/30043 711/131 |
| 5,895,503 A * | 4/1999 | Belgard | ............. | G06F 12/1036 711/200 |
| 5,953,748 A * | 9/1999 | Riordan | ............. | G06F 12/1027 711/203 |
| 5,987,584 A * | 11/1999 | Chambers | ........... | G06F 12/0215 711/154 |
| 6,047,365 A * | 4/2000 | Chambers | ............... | G06F 9/342 711/154 |
| 6,189,074 B1 * | 2/2001 | Pedneau | ............. | G06F 12/1045 711/139 |
| 6,813,699 B1 * | 11/2004 | Belgard | ............. | G06F 12/1036 711/203 |
| 9,934,150 B1 * | 4/2018 | Gautam | ............. | G06F 12/0864 |
| 2008/0046652 A1 * | 2/2008 | Knoth | ................. | G06F 9/30043 711/128 |
| 2008/0046653 A1 * | 2/2008 | Knoth | ................. | G06F 9/30043 711/128 |
| 2013/0268732 A1 * | 10/2013 | Ramaraju | ........... | G06F 12/0895 711/118 |
| 2014/0365742 A1 * | 12/2014 | Patel | ..................... | G06F 12/145 711/163 |
| 2015/0363318 A1 * | 12/2015 | Redford | ............. | G06F 12/0864 711/128 |
| 2016/0217079 A1 * | 7/2016 | Lin | ..................... | G06F 12/0897 |

\* cited by examiner

DATA STORAGE

This application claims priority to GB Patent Application No. 1603295.5 filed Feb. 25, 2016, the entire contents of each of which are hereby incorporated by reference.

BACKGROUND

This disclosure relates to data storage.

In some data storage arrangements there is a need to compare a test address, being a combination of two address operands such as a base address and an offset address, with a reference address. For example, the reference address could be an address of a data item held or cached by a data store.

It is a constant aim to improve such arrangements.

SUMMARY

In an example arrangement there is provided a data storage apparatus comprising:

detection circuitry configured to detect a match between a multi-bit reference memory address and a test address, the test address being a combination of a multi-bit base address and a multi-bit address offset, the detection circuitry comprising:

a comparator configured to compare, as a first comparison, a first subset of bits (for example, of some but not all bits) of the reference memory address with a combination of the corresponding first subset of bits of the base address and the corresponding first subset of bits of the address offset; the comparator being configured to compare, as a second comparison, a second, different subset of bits (for example, of some but not all bits) of the reference memory address with the corresponding second subset of bits of the base address;

a detector configured to detect the match between the reference memory address and the test address when both of the first comparison and the second comparison detect a respective match; and control circuitry configured to control operation of the data storage apparatus in dependence upon the reference memory address when a match is detected by the detector.

In another example arrangement there is provided a data storage apparatus comprising:

detection means for detecting a match between a multi-bit reference memory address and a test address, the test address being a combination of a multi-bit base address and a multi-bit address offset, the detection means being configured to:

means for comparing, as a first comparison, a first subset of bits (for example, of some but not all bits) of the reference memory address with a combination of the corresponding first subset of bits of the base address and the corresponding first subset of bits of the address offset;

means for comparing, as a second comparison, a second, different subset of bits (for example, of some but not all bits) of the reference memory address with the corresponding second subset of bits of the base address;

means for detecting the match between the reference memory address and the test address when both of the first comparison and the second comparison detect a respective match; and means for controlling operation of the data storage apparatus in dependence upon the reference memory address when a match is detected.

In another example arrangement there is provided a method of data storage operation, the method comprising:

detecting a match between a multi-bit reference memory address and a test address, the test address being a combination of a multi-bit base address and a multi-bit address offset, the detecting step comprising:

comparing, as a first comparison, a first subset of bits (for example, of some but not all bits) of the reference memory address with a combination of the corresponding first subset of bits of the base address and the corresponding first subset of bits of the address offset;

comparing, as a second comparison, a second, different subset of bits (for example, of some but not all bits) of the reference memory address with the corresponding second subset of bits of the base address;

detecting the match between the reference memory address and the test address when both of the first comparison and the second comparison detect a respective match; and controlling operation of the data storage apparatus in dependence upon the reference memory address when a match is detected.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Before discussing the embodiments with reference to the accompanying figures, the following description of embodiments is provided.

An example embodiment provides a data storage apparatus comprising:

detection circuitry configured to detect a match between a multi-bit reference memory address and a test address, the test address being a combination of a multi-bit base address and a multi-bit address offset, the detection circuitry comprising:

a comparator configured to compare, as a first comparison, a first subset of bits (for example, of some but not all bits) of the reference memory address with a combination of the corresponding first subset of bits of the base address and the corresponding first subset of bits of the address offset; the comparator being configured to compare, as a second comparison, a second, different subset of bits (for example, of some but not all bits) of the reference memory address with the corresponding second subset of bits of the base address;

a detector configured to detect the match between the reference memory address and the test address when both of the first comparison and the second comparison detect a respective match; and control circuitry configured to control operation of the data storage apparatus in dependence upon the reference memory address when a match is detected by the detector.

The example embodiments provide an arrangement which approximates the result of a comparison as discussed above, by carrying out a full combine-compare operation of the base address, the offset address and the reference address on a first subset of bits, but a simple compare between base and reference addresses on another subset of bits. The arrangement recognizes that in practice, offset addresses may (according to the particular application) be small, such that a full combine-compare operation is not required in order to obtain a useful approximation of the result.

In examples, the first subset of bits comprises a contiguous set of less significant bits; and the second subset of bits comprises all remaining bits which are more significant than those bits in the first subset of bits.

In some situations, false positive detections or false negative detections may not be a problem. In other example situations, false positive detections can cause operational problems. In those examples, the apparatus may comprise an abort detector configured to provide an abort indication to the control circuitry when a predetermined condition applies to one or more bits of the second subset of the address offset. For example, in situations where the combination is an addition, the abort detector may be configured to provide the abort indication to the control circuitry when a carry amount from the addition is different to a group of one or more bits of the second subset of the address offset. The abort signal can be used in various ways. For example, the controller may be configured to cancel a data access by the data storage access in response to the abort indication. In other examples, the controller may be configured, in response to the abort indication, to change a mode of operation for a data access by the data storage apparatus.

An example of use of the technique is in a data storage apparatus such as a cache or similar memory comprising a first storage arrangement configured to store information relating to one or more recently-accessed data items in a second storage arrangement; and in which: the reference address is a memory address of one of the data items for which information is held in the first storage arrangement; and the test address is the address of a currently required data item. The detection (of a match) may be used to control whether the second storage arrangement is powered up or not, so providing a potential net power saving. In such examples, the control circuitry is configured to selectively enable or disable access to the second storage arrangement in dependence upon whether a match is detected between the reference memory address and the test address. For example, the control circuitry may be configured to disable access to the second storage arrangement when a match is detected between the reference memory address and the test address.

Although different numbers of bits could be accommodated, in examples the reference memory address, the base address and the address offset each comprise the same number of bits.

Another example embodiment provides a data storage apparatus comprising:

detection means for detecting a match between a multi-bit reference memory address and a test address, the test address being a combination of a multi-bit base address and a multi-bit address offset, the detection means being configured to:

means for comparing, as a first comparison, a first subset of bits (for example, of some but not all bits) of the reference memory address with a combination of the corresponding first subset of bits of the base address and the corresponding first subset of bits of the address offset;

means for comparing, as a second comparison, a second, different subset of bits (for example, of some but not all bits) of the reference memory address with the corresponding second subset of bits of the base address;

means for detecting the match between the reference memory address and the test address when both of the first comparison and the second comparison detect a respective match; and means for controlling operation of the data storage apparatus in dependence upon the reference memory address when a match is detected.

Another example embodiment provides a method of data storage operation, the method comprising:

detecting a match between a multi-bit reference memory address and a test address, the test address being a combination of a multi-bit base address and a multi-bit address offset, the detecting step comprising:

comparing, as a first comparison, a first subset of bits (for example, of some but not all bits) of the reference memory address with a combination of the corresponding first subset of bits of the base address and the corresponding first subset of bits of the address offset;

comparing, as a second comparison, a second, different subset of bits (for example, of some but not all bits) of the reference memory address with the corresponding second subset of bits of the base address;

detecting the match between the reference memory address and the test address when both of the first comparison and the second comparison detect a respective match; and controlling operation of the data storage apparatus in dependence upon the reference memory address when a match is detected.

Figure 1:
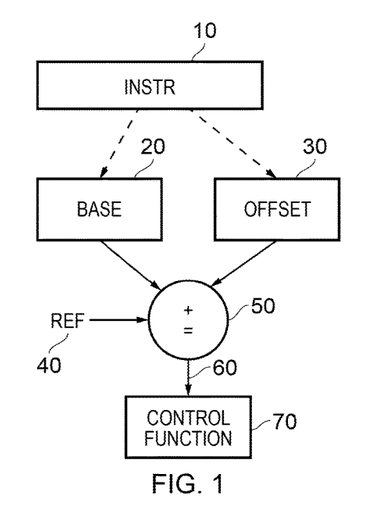
FIGS. 1 and 2 schematically illustrate the use of base and offset addresses.
Figure 2:
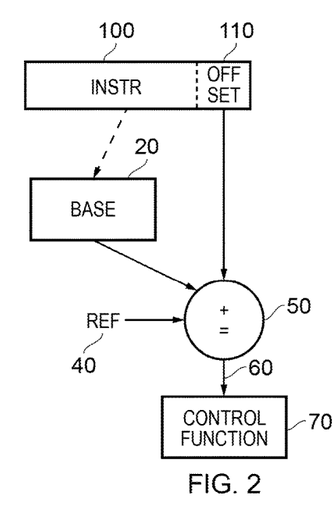

FIGS. 1 and 2 schematically illustrate the use of base and offset addresses. The examples here relate to the generation and use of such addresses as a result of the execution of a data processing instruction by a data processor such as a micro-processor or central processing unit (CPU). However, the same principles are applicable whenever an address, for example for use in accessing a data storage arrangement, is generated from base and offset components.

Referring to FIG. 1, the execution of a data processing instruction 10 defines registers 20, 30 respectively holding a base memory address and an offset memory address. For example, the register 20 could be a program counter (PC) register, and the offset could be held in a register (acting as the register 30) which is, for example, a processor register.

In these arrangements, a test address, being a combination of the base and offset addresses, is to be compared with a reference memory address 40. Various applications and example operations in which such a comparison might be appropriate will be discussed below.

The combination of the base and offset addresses may be an additive combination, such that the offset address is added to the base address. However, other types of combination are possible, such as a subtraction of the offset address from the base address or a bit-by-bit logical combination of respective bits of the offset address with respective bits of the base address. Therefore, an additive combination is discussed here purely as an example of such a combination.

In some situations, the comparison between the reference address and the combination of the base and offset addresses can be a timing-critical operation, or at least an operation which is better or more useful when carried out more quickly. In some examples, the addition and comparison operations are grouped into a single logical operation in order to save a few logic gates (and potentially make a time saving) in a timing critical path. Such an arrangement is used in FIG. 1, in which a single logic circuit 50 provides the addition of the base and offset addresses and the comparison with the reference address 40 so as to provide an output 60 indicative of a match, and which controls a control function 70, for example a control function of a data storage apparatus. Examples of such a control function will be discussed below.

Note that the detection of a match by the logic 50 may, as discussed below, be a so-called speculative result which may or may not be correct. In other words, the detection is an assertion that identity exists between the test variables (the reference 40 and the combination of the base 20 and offset 30), but in the case of a speculative result, that assertion is still a "detection of a match" but may be found to be incorrect.

Another example is provided in FIG. 2, in which an instruction 100 has, as part of the instruction code itself, data indicating the offset 110. This is added to a base address stored in the base address register 20 as discussed above by the adder-comparator 50 at which stage the additive combination of the base address and the offset is compared with the reference address 40 to provide the output 60 to control the control function 70.

In some instances, however, the full comparator result may be generated too late for the required purpose. Arrangements will now be described to alleviate this potential problem.

Figure 3:
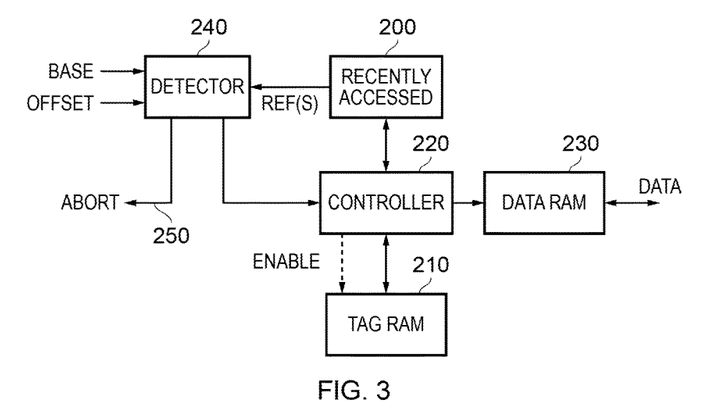
FIG. 3 schematically illustrates a cache memory.

FIG. 3 schematically illustrates a cache memory as an example of a data storage apparatus in which the present techniques may be used.

The cache memory makes use of a so-called cache way tracker arrangement. This provides a store 200 of recently-accessed entries in the cache memory, in effect providing a cache of tags relating to those recently-accessed items. For a newly-required access, if it can be detected that the newly-required access in fact relates to the same address as one of the recently-accessed items stored in the store 200, the system can access the tag stored in the store 200 rather than enabling (for example, powering up) a full tag RAM 210. This can provide a power saving by selectively avoiding the need to power up the tag RAM 210.

In order for such a system to operate efficiently, a detection is required as to whether a newly-required address does indeed relate to one of the items stored in the store 200. If a hit or match is detected, then a controller 220 can obtain the required tag information (to allow the data RAM holding the actual cache entries 230 to be accessed) from the store 200. If a miss or a lack of match is detected then the controller 220 can power up and enable the tag RAM 210 and obtain the required tag from the tag RAM 210. Therefore, this represents an example of a first storage arrangement (such as the store 220) configured to store information relating to one or more recently-accessed data items in a second storage arrangement (such as the tag RAM 210); and the reference address being a memory address of one of the data items for which information is held in the first storage arrangement. For example, the test address can be the address of a currently required data item. In these respects, the controller 220 provides an example of control circuitry control circuitry configured to selectively enable or disable access to a second storage arrangement (such as the tag RAM) in dependence upon whether a match is detected between the reference memory address and the test address, for example being configured to disable access to the second storage arrangement when a match is detected between the reference memory address and the test address.

In general terms, the controller 220 provides an example of control circuitry configured to control operation of the data storage apparatus in dependence upon the reference memory address when a match is detected by the detector.

A detector 240 handles this detection and acts as detection circuitry configured to detect a match between a multi-bit reference memory address and a test address, the test address being a combination of a multi-bit base address and a multi-bit address offset. The detector 240 is responsive to a base address and an offset address, for example received from or specified by execution of an instruction as discussed with reference to FIGS. 1 and 2. The detector 240 compares a combination such as an additive combination of the base and offset addresses with one or more reference addresses representing memory addresses for which information is stored in the store 200.

In the present examples, the detector 240 provides an early "speculative" result as to whether the sum of the base and offset addresses is the same as one of the reference addresses provided by the store 200. The speculative result is derived in such a way that in many, or even in most, instances it is expected to be correct. However, in a subset of instances the speculative result may be incorrect. For this reason, the detector 240 is configured to provide an abort signal 250 which can be provided to a device requesting information from the cache memory in the same way as an error signal generated for any other reason (such as address translation errors, item not found in the cache memory and so on) during access to the cache memory.

In example embodiments, the tag RAM is not powered up and the cache memory relies on the tag stored in the store 200 to allow the correct data RAM holding the cache entry 230 to be accessed. If a false hit were to be obtained by the detector 240, it could be that the wrong data RAM (or the wrong bank or partition of the data RAM) would be accessed. In some examples, therefore, the abort signal 250 indicates that the speculative detection by the detector 240 was incorrect and the access should simply be aborted and retried as another instance of the access. This provides an example of the controller being configured to cancel a data access by the data storage access in response to the abort indication.

In other examples, the abort signal (which simply indicates that the speculative result was in fact wrong) could be used to cause the cache memory to power up the tag RAMs (whereas—if the speculative result had been correct—they would not have been powered up). So in these examples, the access still proceeds when the abort signal is asserted, but in a different form. In this context, the abort signal does not therefore have to indicate that the entire access should be aborted, but rather that the access originally initiated, based on the (now found to be incorrect) speculative result, should not proceed as originally initiated, but should proceed in a different (possibly slower, and/or more power-consuming) form. This provides an example of the controller being configured, in response to the abort indication, to change a mode of operation for a data access by the data storage apparatus.

The speculative detection has the potential advantage of being quicker than a full detection. Accordingly, the speculative detection can be carried out rapidly, and the generation of the abort signal can take longer, such that the abort signal needs to be provided only in time to cancel that access to the cache memory.

In other examples, the abort signal 250 is not generated by the detector 240, but instead is provided by the controller 220 consulting the tag RAM 210 to check that the outcome provided by the store 200 (on the basis of the rapidly obtained speculative result from the detector 240) is indeed correct. If not, then either the access can be aborted or it can be continued but in a different form, as discussed above. Although this means powering up the tag RAM 210 even when a speculative result is obtained by the detector 240, it retains the advantage of a potential speed improvement by using the speculative result when available.

If the detection by the detector 240 were always correct, then for any items having a tag stored in the store 200, the controller 220 would retrieve that tag, access the data RAM 230 and not enable the tag RAM 210. For any addresses correctly detected not to have a tag stored in the store 200, the controller 220 would enable and access the tag RAM 210 to obtain a tag and, using that tag, access the data RAM 230. However, if the speculative detection value detector 240 is wrong, and a false miss is detected (so that even though the required address has a tag stored in the store 200, this fact is not detected by the detector 240) the system still operates correctly in that the controller 220 obtains the tag from the tag RAM 210 instead of from the store 200. So, a false miss still provides the correct functionality, just with a slight power penalty. However, if the detector 240 were to detect a false hit, this would not provide the required outcome in that the controller 220 would attempt to obtain the tag from the store 200 but the tag would not be present. So, in example embodiments the detector 240 can be allowed to generate false miss outcomes but not false hit outcomes. An example of the detector 240 will be discussed below with reference to FIG. 4.

A final aspect of the cache memory of FIG. 3 is that in response to an access to the cache memory, the controller 220 stores tag information relating to that access in the store 200 of recently-accessed items, displacing, for example, the least recently used entry in the store 200.

Figure 4:
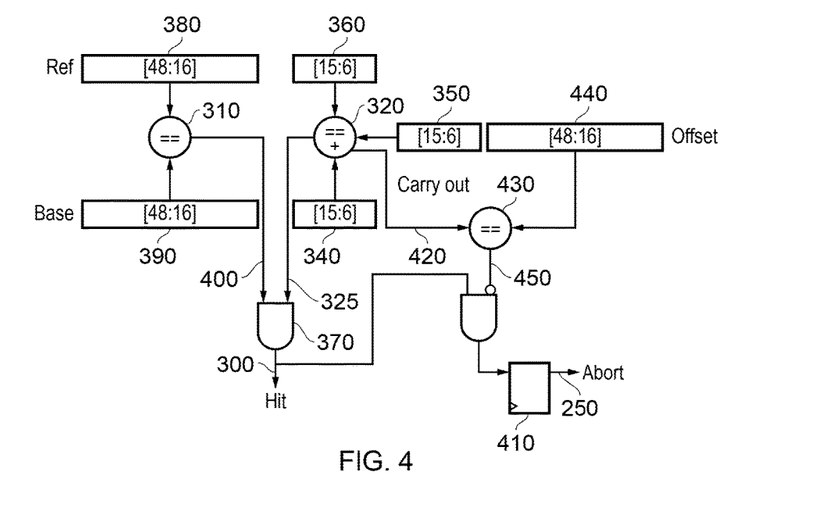
FIG. 4 schematically illustrates an example of detection circuitry.

FIG. 4 schematically illustrates an example of detection circuitry configured to detect a match between a multi-bit reference memory address and a test address, the test address being a combination of a multi-bit base address and a multi-bit address offset. Note that the processing applicable to one such reference address is shown, for clarity of the diagram. If a comparison with more than one reference address were provided (for example, by the store 200) then multiple instances of at least parts of the circuitry of FIG. 4 could be provided.

The detection circuitry of FIG. 4 is arranged to provide two outputs: a hit (or match) output 300 and an abort output 250 as discussed above. The hit output is provided to the controller 220 of FIG. 3 in order to indicate that a match has been detected between a reference address corresponding to one of the items stored in the store 200 and the sum of the base and offset addresses, at least on a speculative basis. The abort output 250 is provided, for example later (such as one cycle of a clock signal later) to indicate that the speculative hit was in fact incorrect.

The detection circuitry comprises a comparator, formed in this example of two comparator circuits 310, 320, configured to compare, as a first comparison (by the circuit 320) a first subset of bits (in examples, some but not all bits) of the reference memory address with a combination of the corresponding first subset of bits of the base address and the corresponding first subset of bits of the address offset. In the example shown, the first subset of the reference address comprises bits 6 . . . 15 of the reference address. The corresponding subset (bits 6 . . . 15) 340 of the base address is added to the corresponding subset (bits 6 . . . 15) 350 of the offset address and compared to the first subset 360 of the reference address. If a match is detected by the circuitry 320, a first match signal 325 is provided to an AND gate 370.

Separately, the circuitry 310 provides a simple comparison between the remaining more significant bits (bits 16 . . . 48) 380 of the reference address with the corresponding bits (16 . . . 48) 390 of the base address, providing a second match signal 400 which is supplied to the AND gate 370.

In these examples, the first and second match signals 325, 400 are not themselves speculative, but the combination of them in the present arrangement can give rise to a speculative result relating to whether the reference address is the same as the combination of the base and offset addresses.

Here, in the context of multi-bit variables such as memory addresses having the same number of bits, the term "corresponding" indicates the same bit positions in the multi-bit variables. It can also be envisaged that the multi-bit variables could have different numbers of bits. In such a context, the term "corresponding" can be taken to indicate the same bit positions in the multi-bit variables, to the extent that such bit positions exist.

These two comparison operations provide examples of the operation of a comparator configured to compare, as a first comparison, a first subset of bits (in examples, some but not all bits) of the reference memory address with a combination of the corresponding first subset of bits of the base address and the corresponding first subset of bits of the address offset; the comparator being configured to compare, as a second comparison, a second, different subset of bits (in examples, some but not all bits) of the reference memory address with the corresponding second subset of bits of the base address.

Accordingly, the first and second match signals are generated as discussed above with respect to: a first subset of bits comprising a contiguous set of less significant bits; and a second subset of bits comprises all remaining bits which are more significant than those bits in the first subset of bits.

If both of the first and second signals 400 supplied to the AND gate 370 indicate a respective match, the AND gate asserts the hit output 300, thereby providing an example of a detector configured to detect the match between the reference memory address and the test address (formed, in this example, as a combination of the base address and the offset address) when both of the first comparison and the second comparison detect a respective match.

Therefore, the circuitry of FIG. 4 described so far provides an indication of a speculative match by carrying out a full addition-comparison of a subset of lower or less significant bits of the base address, the offset address and the reference address, and providing a simple comparison of more significant bits of the reference address with corresponding more significant bits of the base address.

In many instances, the speculative hit or match detected in this way will be correct, given that offset addresses are often, in real implementations, either zero or near to zero, so that the combination of the offset address with the base address tends not to affect the higher or more significant bits of the base address. In example situations where a false hit is not a functional problem for the control circuitry which is controlled by the output 300, the circuitry described so far of FIG. 4 is sufficient. However, in examples such as the cache way tracker arrangement of FIG. 3, the apparatus can proceed initially on the basis of the speculative hit detection but an abort signal such as the signal 250 is also used in order to cancel a memory access transaction if the speculative hit is later found to have been incorrect.

The generation of the abort signal 250 can take longer than the generation of the speculative hit signal, and in the present example the abort signal is supplied, under the control of an output flip flop 410, one clock cycle into the memory access transaction, or approximately a clock cycle later than the hit signal 300 is provided.

The abort signal is generated as follows. In the addition-comparison carried out by the circuitry 320, a carry out value 420 is generated, indicative of an arithmetic carry in the combination operation carried out by the circuitry 320. A further comparator 430 compares the carry out value with the second subset (bits 16 . . . 48) 440 of the offset address, although in other examples fewer than the whole second subset of bits may be used, for example one or more less significant bits of the offset portion 440.

If the comparator 430 detects that the carry out bits are the same as the portion 440 of the offset then this can be an indication that the speculative detection was correct and the abort signal is not asserted. If however the comparator 430 detects a lack of a match between the carry out bits 420 and the portion 440 of the offset then the output 450 of the comparator 430 is combined with the hit signal 300 to generate the abort signal 250 which is output, as mentioned above, at a next clock cycle by the flip flop 410. The combination with the hit signal by the AND gate 450 provides the feature that the abort signal is not generated if the hit signal has not itself been already asserted.

This circuitry provides an example of an abort detector configured to provide an abort indication to the control circuitry when a predetermined condition applies to one or more bits of the second subset of the address offset. For example, in instances where the combination is an addition, the abort detector may be configured to provide the abort indication to the control circuitry when a carry amount from the addition is different to a group of one or more bits of the second subset of the address offset.

In some embodiments the reference memory address, the base address and the address offset each comprise the same number of bits, for example 48 bits. It may be that in the arrangement in use, a group of least significant bits (such as the bits 0 . . . 5) are not used in the comparison of the reference and test addresses, because those bits in fact provide an index into a set of multiple (such as 32) entries in a single storage area such as a cache line holding multiple separately-addressed data items.

Figure 5:
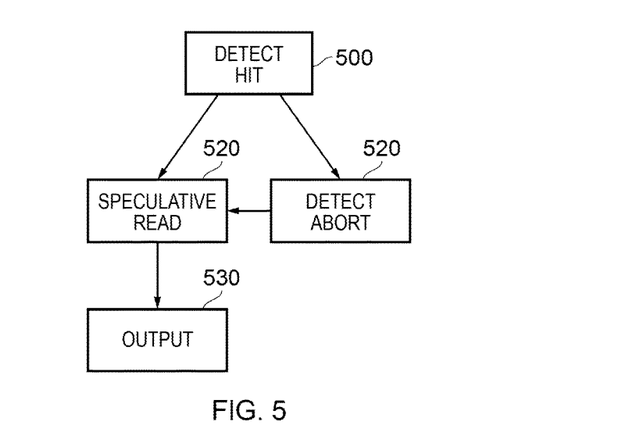
FIG. 5 is a schematic flowchart illustrating the operation of a cache memory.

FIG. 5 is a schematic flowchart illustrating the operation of a cache memory of the type discussed with reference to FIGS. 3 and 4.

At a step 500, a speculative hit is detected and the hit signal 300 is asserted. The process to detect the abort signal 250 is started at a step 510. Note that the step 510 can start before the termination of the step 500, but in the present examples the step 510 finishes some time after the end of the step 500.

In response to the detection of a hit, the controller 220 carries out a speculative read (at a step 520) of the store 200 and of the data RAM 230 using information obtained from the store 200. The controller 220 does not, in these circumstances, enable the tag RAM 210. This process can be aborted by an abort signal 250 from the step 510, but otherwise an output (for example, an address in the data RAM or contents of information stored in the data RAM) is generated at a step 530.

Figure 6:
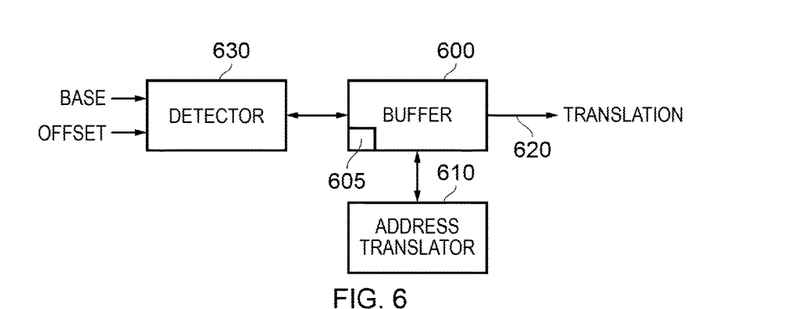
FIG. 6 schematically illustrates a translation lookaside buffer.
Figure 7:
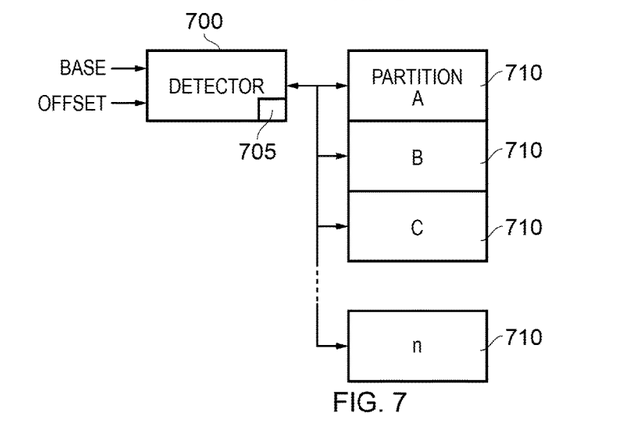
FIG. 7 schematically illustrates a partitioned memory device.

The example discussed so far relates to a cache memory. FIGS. 6 and 7 provide other examples in which the present techniques can be useful.

FIG. 6 schematically illustrates a translation lookaside buffer which is used in virtual memory systems to store, and provide when required, memory translations between virtual memory addresses and physical memory addresses. To achieve this, the translation lookaside buffer (TLB) stores memory address translations in a buffer 600. If a particular required virtual memory address is not stored (as a translation) in the buffer 600, the TLB refers to an address translator 610 to obtain that translation and then to store it in the buffer 600. Otherwise, if the required translation is stored in the buffer 600, it is simply output as an output translation 620. These operations are overseen by control circuitry 605 configured to control operation of the data storage apparatus in dependence upon the reference memory address when a match is detected by the detector.

A detector 630 receives base and offset virtual memory addresses and operates as discussed above to compare the combination of the base and offset addresses with reference memory addresses indicative of translations stored in the buffer 600. This allows a speculative access to the buffer 600 to be initiated quickly. If, however, the abort signal 250 is asserted by the detector 630, the speculative access is aborted and reference is made by the buffer 600 to the address translator 610 to obtain the required translation.

FIG. 7 is another example illustrating a partitioned memory device. Here, base and offset memory addresses are provided to a detector 700 which detects possible matches between the base and offset addresses and reference addresses indicative of memory locations in multiple partitions 710 of a data storage device. In this example, the abort circuitry is not required. For any partition(s) for which a hit is detected, that partition is powered up and accessed. Accordingly, in this example, false hits are not necessarily a problem, but the other advantages of the circuitry of FIG. 4, in particular the more rapid generation of a speculative hit signal, can provide faster access to the storage of the various partitions. These operations are overseen by control circuitry 705 configured to control operation of the data storage apparatus in dependence upon the reference memory address when a match is detected by the detector.

Figure 8:
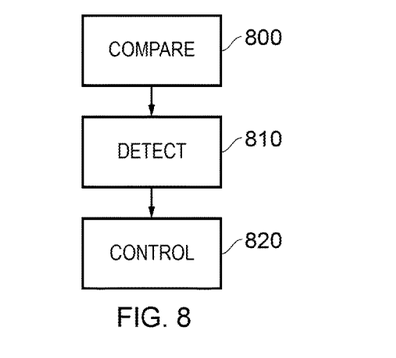
FIG. 8 is a schematic flowchart illustrating a method of data storage operation.

FIG. 8 is a schematic flow chart illustrating a method of data storage operation, the method comprising detecting a match between a multi-bit reference memory address and a test address, the test address being a combination of a multi-bit base address and a multi-bit address offset, the detecting comprising:

Comparing (at a step 800), as a first comparison, a first subset of bits (in examples, of some but not all bits) of the reference memory address with a combination of the corresponding first subset of bits of the base address and the corresponding first subset of bits of the address offset; and comparing, as a second comparison, a second, different subset of bits (in examples, of some but not all bits) of the reference memory address with the corresponding second subset of bits of the base address;

detecting (at a step 810) the match between the reference memory address and the test address when both of the first comparison and the second comparison detect a respective match; and controlling (at a step 820) operation of the data storage apparatus in dependence upon the reference memory address when a match is detected.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. Data storage apparatus comprising:
   detection circuitry to detect a match between a multi-bit reference memory address and a test address, the test address being a combination of a multi-bit base address and a multi-bit address offset, the detection circuitry comprising:
   a comparator to compare, as a first comparison, a first subset of bits of the reference memory address with a combination of the corresponding first subset of bits of the base address and the corresponding first subset of bits of the address offset; the comparator being configured to compare, as a second comparison, a second, different subset of bits of the reference memory address with the corresponding second subset of bits of the base address;
   a detector to detect the match between the reference memory address and the test address when both of the first comparison and the second comparison detect a respective match; and
   control circuitry to control operation of the data storage apparatus in dependence upon the reference memory address when a match is detected by the detector.

2. Apparatus according to claim 1, in which:
   the first subset of bits comprises a contiguous set of less significant bits; and
   the second subset of bits comprises all remaining bits which are more significant than those bits in the first subset of bits.

3. Apparatus according to claim 1, comprising an abort detector to provide an abort indication to the control circuitry when a predetermined condition applies to one or more bits of the second subset of the address offset.

4. Apparatus according to claim 3, in which the controller is configured to cancel a data access by the data storage access in response to the abort indication.

5. Apparatus according to claim 3, in which the controller is configured, in response to the abort indication, to change a mode of operation for a data access by the data storage apparatus.

6. Apparatus according to claim 3, in which the combination is an addition.

7. Apparatus according to claim 6, in which the abort detector is configured to provide the abort indication to the control circuitry when a carry amount from the addition is different to a group of one or more bits of the second subset of the address offset.

8. Apparatus according to claim 1, comprising a first storage arrangement to store information relating to one or more recently-accessed data items in a second storage arrangement; and in which:
   the reference address is a memory address of one of the data items for which information is held in the first storage arrangement; and
   the test address is the address of a currently required data item.

9. Apparatus according to claim 8, in which the control circuitry is configured to selectively enable or disable access to the second storage arrangement in dependence upon whether a match is detected between the reference memory address and the test address.

10. Apparatus according to claim 9, in which the control circuitry is configured to disable access to the second storage arrangement when a match is detected between the reference memory address and the test address.

11. Apparatus according to claim 1, in which the reference memory address, the base address and the address offset each comprise the same number of bits.

12. Data storage apparatus comprising:
   detection means for detecting a match between a multi-bit reference memory address and a test address, the test address being a combination of a multi-bit base address and a multi-bit address offset, the detection means being configured to:
   means for comparing, as a first comparison, a first subset of bits of the reference memory address with a combination of the corresponding first subset of bits of the base address and the corresponding first subset of bits of the address offset;
   means for comparing, as a second comparison, a second, different subset of bits of the reference memory address with the corresponding second subset of bits of the base address;
   means for detecting the match between the reference memory address and the test address when both of the first comparison and the second comparison detect a respective match; and
   means for controlling operation of the data storage apparatus in dependence upon the reference memory address when a match is detected.

13. A method of data storage operation, the method comprising:
   detecting a match between a multi-bit reference memory address and a test address, the test address being a combination of a multi-bit base address and a multi-bit address offset, the detecting step comprising:
   comparing, as a first comparison, a first subset of bits of the reference memory address with a combination of the corresponding first subset of bits of the base address and the corresponding first subset of bits of the address offset;

comparing, as a second comparison, a second, different subset of bits of the reference memory address with the corresponding second subset of bits of the base address;

detecting the match between the reference memory address and the test address when both of the first comparison and the second comparison detect a respective match; and controlling operation of the data storage apparatus in dependence upon the reference memory address when a match is detected.

* * * * *